(12) United States Patent
Kazmi et al.

(10) Patent No.: US 10,390,324 B2
(45) Date of Patent: Aug. 20, 2019

(54) ADAPTIVE MEASUREMENT REPORT MAPPING FOR UE POSITIONING

(71) Applicant: Telefonaktiebolaget LM Ericsson (publ), Stockholm (SE)

(72) Inventors: Muhammad Kazmi, Sundbyberg (SE); Yufei Blankenship, Kildeer, IL (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/574,041

(22) PCT Filed: May 25, 2016

(86) PCT No.: PCT/SE2016/050486
§ 371 (c)(1),
(2) Date: Nov. 14, 2017

(87) PCT Pub. No.: WO2016/190806
PCT Pub. Date: Dec. 1, 2016

(65) Prior Publication Data
US 2018/0302873 A1    Oct. 18, 2018

(30) Foreign Application Priority Data
May 25, 2015   (SE) ...................................... 1500247

(51) Int. Cl.
*H04W 64/00*        (2009.01)
*H04W 24/10*        (2009.01)
*H04W 88/02*        (2009.01)
(52) U.S. Cl.
CPC ........... *H04W 64/00* (2013.01); *H04W 24/10* (2013.01); *H04W 88/02* (2013.01)

(58) Field of Classification Search
CPC .......... G01C 21/00; H04W 4/029; H04W 4/33
USPC ........ 435/6.11; 600/378, 466, 590; 345/690, 345/348, 582, 174, 149; 382/113; 455/456.1, 456.2, 41.2
See application file for complete search history.

(56) References Cited

U.S. PATENT DOCUMENTS

| | | | |
|---|---|---|---|
| 9,125,019 B1* | 9/2015 | Heikkila | H04W 4/029 |
| 2004/0106379 A1* | 6/2004 | Zen | H04W 48/20 |
| | | | 455/67.11 |
| 2004/0203904 A1* | 10/2004 | Gwon | G01S 5/0252 |
| | | | 455/456.1 |

(Continued)

FOREIGN PATENT DOCUMENTS

| | | |
|---|---|---|
| WO | 2012044246 A1 | 4/2012 |
| WO | 2012112101 A1 | 8/2012 |

(Continued)

OTHER PUBLICATIONS

International Search Report and Written Opinion dated Sep. 5, 2016 for International Application No. PCT/SE2016/050486 filed May 26, 2016 consisting of 15-pages.

(Continued)

*Primary Examiner* — Kiet M Doan
(74) *Attorney, Agent, or Firm* — Sage Patent Group

(57) ABSTRACT

There is disclosed a method for operating a network node in a wireless communication network. The method includes configuring a terminal with a measurement configuration based on a resolution for measurements of positioning signals. Related methods and devices are also discussed.

19 Claims, 4 Drawing Sheets

(56) References Cited

U.S. PATENT DOCUMENTS

| | | | |
|---|---|---|---|
| 2006/0022871 A1* | 2/2006 | Zimmerman | G01S 19/11 |
| | | | 342/464 |
| 2008/0039114 A1* | 2/2008 | Phatak | G01S 5/0252 |
| | | | 455/456.1 |
| 2015/0094952 A1* | 4/2015 | Moeglein | H04W 4/029 |
| | | | 701/491 |

FOREIGN PATENT DOCUMENTS

| | | | |
|---|---|---|---|
| WO | 2012113435 A1 | 8/2012 | |
| WO | 2013150344 A1 | 10/2013 | |

OTHER PUBLICATIONS

3GPP TSG-RAN Meeting #65, RP-141102, Revision of RP-yynnnn, Title: "Revised SID:Study on Indoor Positioning Enhancements for UTRA and LTE," Source: NextNav, Agenda item: 13.2.3, Document for: Approval, Location and Date: Edinburgh, Scotland Sep. 9-12, 2014 consisting of 7-pages.

Fischer, Sven; Title: "Observed Time Difference of Arrival (OTDOA) Positioning in 3GPP LTE," Source: Qualcomm Technologies, Inc., Date: Jun. 6, 2014 consisting of 62-pages.

ETSI TS 136 355 v12.2.0 (Oct. 2014), Title: LTE; Evolved Universal Terrestrial Radio Access (E-UTRA); LTE Positioning Protocol (LPP) (3GPP TS 36.355 version 12.2.0 Release 12); France, Oct. 2014 consisting of 128-pages.

ETSI TS 136 133 v11.10.0 (Nov. 2014), Title: LTE; Evolved Universal Terrestrial Radio Access (E-UTRA); Requirements for support of radio resource management (3GPP TS 36.133 version 11.10.0 Release 11); France, Nov. 2014 consisting of 802-pages.

* cited by examiner

US 10,390,324 B2

ADAPTIVE MEASUREMENT REPORT MAPPING FOR UE POSITIONING

CROSS-REFERENCE TO RELATED APPLICATIONS

This application is a Submission Under 35 U.S.C. § 371 for U.S. National Stage Patent Application of International Application Number: PCT/SE2016/050486, filed May 25, 2016 entitled "ADAPTIVE MEASUREMENT REPORT MAPPING FOR UE POSITIONING," which claims priority to Swedish Patent Application No.: 1500247-0, filed May 25, 2015, the entireties of both of which are incorporated herein by reference.

TECHNICAL FIELD

The present disclosure pertains to positioning technology in wireless communication systems.

BACKGROUND

An increasing number of applications in the field of wireless communication technology, in particular mobile communication technology, require increasingly precise location (positioning) data of individual wireless communication devices like terminals. For example, emergency services may require as precise location data as possible, or applications used indoors may provide the better user experience the better the location of a user (respectively, his or her terminal) is known.

SUMMARY

It is an object of the present disclosure to provide approaches facilitating efficient measurements, in particular regarding positioning (localization) in the context of wireless communication.

According to one of the approaches described herein, there is disclosed a method for operating a network node in a wireless communication network. The method comprises configuring a terminal with a measurement configuration based on a resolution for measurements of positioning signals.

Moreover, a network node for a wireless communication network is proposed. The network node is adapted for configuring a terminal with a measurement configuration based on a resolution for measurements of positioning signals.

In addition, a method for operating a terminal in a wireless communication network may be considered. The method comprises mapping measurement data to at least one measurement indicator, the mapping being based on an adaptable resolution and/or a resolution configuration.

A terminal for a wireless communication network is also disclosed. The terminal is adapted for mapping measurement data to at least one measurement indicator, the mapping being based on an adaptable resolution and/or a resolution configuration.

There may be considered a program product comprising code executable by control circuitry, the code causing the control circuitry to carry out and/or control any one or any combination of methods described herein.

Moreover, a storage medium storing any of the program products described herein and/or code executable by control circuitry is proposed. The code causes the control circuitry to carry out and/or control any one or any combination of methods described herein.

Approaches described herein may in particular facilitate flexible measurements and/or positioning, while keeping undesired signaling overhead limited.

BRIEF DESCRIPTION OF THE DRAWINGS

The drawings are provided to illustrate concepts and approaches of the disclosure and are not intended as limitation. The drawings comprise.

DETAILED DESCRIPTION

Figure 1:
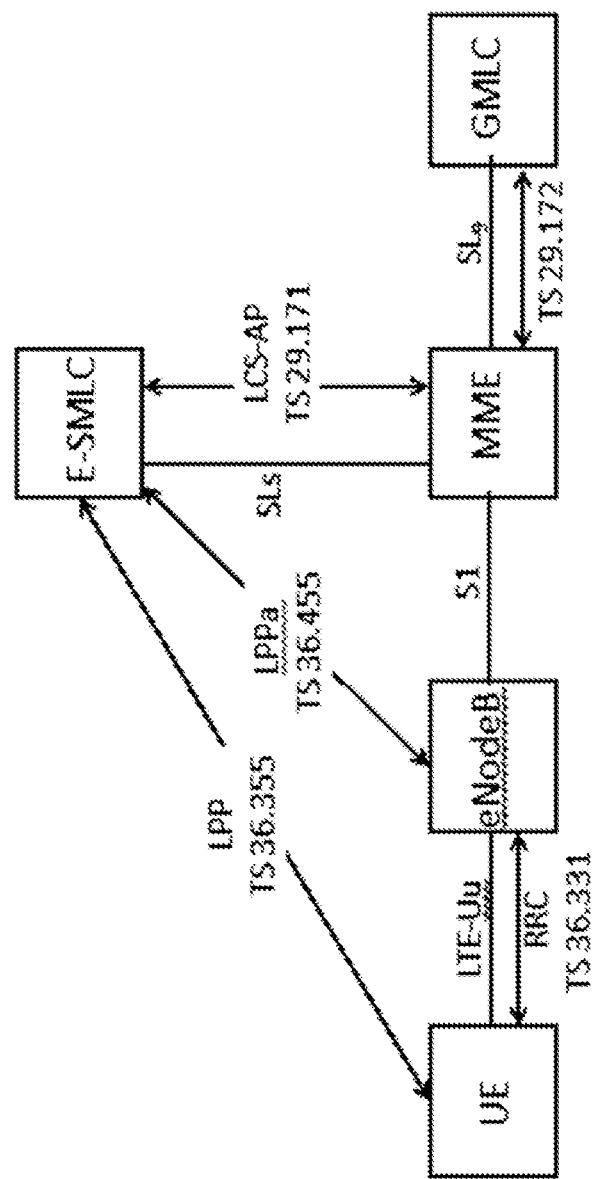
FIG. 1, showing an exemplary LTE positioning architecture.

There are described approaches allowing flexible localization schemes for a UE in a wireless communication network. Herein, the terms localization and positioning and/or position estimation may be used interchangeably.

Generally, multilateration may comprise and/or represent position estimation and/or calculation and/or determination based on signal runtimes, in particular runtime differences, and/or corresponding reports, which may comprise and/or represent and/or indicate runtimes and/or runtime differences, and/or associated ranges (of runtimes and/or runtime differences). It may be considered that multilateration is performed by a node, e.g. a network node (for example an eNodeB and/or higher-level node, for example a positioning node and/or Location Server), which may be adapted accordingly and/or may comprise a corresponding multilateration module.

A positioning signal (e.g., a Positioning Reference Signal) generally may comprise one or more symbols (each symbol may be representing or comprising bits or information or signaling jointly encoded and/or modulated) and/or utilize one or more resources, in particular time-frequency resources, e.g. slots and/or subframes and/or subcarriers. A positioning signal may be provided and/or transmitted by a network node or eNodeB.

A measurement may in particular be a runtime measurement and/or may comprise a measurement performed on one or more positioning signals. It may be configured that a measurement/runtime measurement comprises and/or is represented by a runtime measured and/or a runtime difference, e.g. a Tx-Rx difference. Runtime differences may pertain to differences between runtimes of positioning signals from different sources, e.g. eNodeBs or base station or (radio) network nodes. Measurement data may generally be indicative of one or more performed measurements, and/or may generally be represented by raw measurement data and/or be based on such, e.g. be provided by processing of raw measurement data. Such processing may for example include performing estimations and/or computations and/or calculations and/or statistical analysis (e.g., averaging and/or weighing). A measurement indicator may generally be an indicator of measurement data, for example an index for a table. There is disclosed a method for operating a user equipment (UE) or terminal for and/or in a wireless and/or cellular communication network, and/or a user equipment for a wireless communication network, which may be correspondingly adapted, e.g. for performing the method and/or actions of the method. The method may comprise, and/or the UE may be adapted for, and/or comprise a measurement module for, mapping measurement data to measurement indicator/s, the mapping being based on an adaptable resolution and/or a resolution configuration. The measurement data may pertain to and/or comprise runtime measurements and/or runtime measurement data, and/or the measurement indicator/s may be called runtime measurement indicator/s (the shorthand indicator/s indicate at least one indicator or one or more indicators, the analogue holds for analogue terms). Generally, runtime measurement data may pertain to runtime measurements and/or runtime difference measurements. The method may comprise, and/or the UE and/or measurement module may be adapted for, selecting and/or configuring the resolution and/or resolution configuration. Selecting and/or configuring may be based on allocation data, e.g. received from a network node or network, and/or based on at least one received positioning signal, in particular based on a characteristic of the at least one received positioning signal. The characteristic may in particular be the bandwidth of the positioning signal. It may be considered that the method comprises, and/or the UE is adapted for, and/or comprises a signal module for, receiving at least one positioning signal and/or for determining the characteristic of the positioning signal. Mapping based on an adaptable resolution may comprise choosing one of at least two mappings or tables for mapping. Each table may be based on different resolutions and/or provide different mappings based on different resolutions. The tables may be predetermined, e.g. according to a standard, and/or dependent on the measurement capabilities of the UE. The mappings and/or tables may be stored in a memory of the UE.

The method may comprise, and/or the UE may be adapted for, and/or comprise a measurement module, for performing measurements and/or for providing measurement data based on measurements. The UE may be adapted to perform the measurements and/or to provide the measurement data with at least the adaptable resolution. In particular, the UE may be adapted for measurements with the highest resolution of the set of resolutions. The measurements may include runtime measurements and/or difference measurement and/or signal strength measurements.

The method may comprise, and/or the UE may be adapted for, and/or comprise a receiving module for, receiving allocation data and/or configuration information, and/or configuring itself based on such data or information. The allocation data and/or configuration information may indicate a measurement configuration.

The method may comprise, and/or the UE may be adapted for, and/or comprise a transmitting module for, transmitting the measurement indicator/s, e.g. to a network or network node. Transmitting may comprise transmitting a resolution indicator, which may be indicative of which resolution the mapping is based on. The resolution indicator may comprise and/or be implemented as a table indicator, which may indicate the table used for mapping. Alternatively or additionally, transmitting may comprise transmitting an accuracy indicator, which may e.g. indicate a resolution and/or a resolution range. Alternatively or additionally, transmitting may comprise transmitting a signal strength indicator, which may represent and/or a measured signal strength.

A measurement configuration may generally indicate and/or comprise a resolution and/or resolution configuration. Additionally, a measurement configuration may comprise and/or indicate measurement settings of and/or for the UE, in particular pertaining to sampling rate and/or measurement bandwidth and/or (physical) measurement resolution (e.g., in regards to time resolution), in particular, if the UE is capable of changing such settings; a measurement capability report may indicate settings available for the UE. A measurement configuration may pertain to one or more than one source of positioning signals, e.g. a network node may be adapted to configure a UE for measurements on positioning signals from more than one source, which may include the configuring network node and/or different network nodes, e.g. different eNodeBs. It may be considered that for different sources different configurations are configured, e.g. regarding resolution and/or measurement settings.

It may generally be considered that a resolution pertains to a reporting resolution, which may be a resolution of measurement indicator/s, which may be transmitted and/or reported to a network. The reporting resolution may generally be lower than a (physical measurement) resolution and/or a measurement data resolution, and/or such resolutions may be mappable to the (reporting) resolution.

A (reporting) resolution may generally represent or indicate a resolution in time. The resolution may be adaptable and/or configurable, e.g. based on a configuration, which may be configured or configurable by a network node. An adaptable resolution and/or a resolution configuration may represent a set of at least two different resolutions or resolution configurations, which may e.g. be pre-defined, e.g. according to a telecommunication standard like LTE. The set of resolution may comprise at least a higher resolution and a lower resolution, wherein a higher resolution may be represented by a smaller time unit of the resolution and vice versa. A resolution and/or resolution configuration may be represented by a mapping and/or table based on at least one resolution and/or providing a mapping or indexing of measurement and/or measurements results to an indicator based on at least one resolution. It may be considered that for a given table or mapping, the resolution is adaptable or changes, e.g. for different rows or lines of a table, the resolution may be different. A resolution may be represented by the smallest unit in time able to be represented and/or indicated.

Additionally or alternatively, there may be considered a method for operating a UE for and/or in a wireless communication network, and/or a UE for a wireless communication network, which may be adapted to perform the method. The method may comprise signaling, to a network and/or network node, measurement capabilities of the UE and/or a corresponding measurement capabilities report, wherein the measurement capabilities may pertain to positioning signal measurements. A measurement capabilities report may generally indicate the measurement capabilities of the UE. Measurement capabilities may generally comprise bandwidth/s and/or sampling rate/s and/or measurement resolution (in particular time resolution) and/or sensitivity/ies and/or adaptability regarding one or more of such parameters and/or capabilities (e.g., if the UE is able to change sampling rates).

There is also disclosed a method for operating a network node for and/or in a wireless and/or cellular communication network, and/or a network node for a wireless communication network, which may be adapted for performing the method. The method may comprise, and/or the network node may be adapted for, and/or comprise a configuring module for, configuring a UE with a measurement configuration based on a resolution for measurements of positioning signals. Configuring may comprise signaling (representing allocation data and/or the configuration) a bandwidth and/or bandwidth indication, the bandwidth or bandwidth indication pertaining to a bandwidth of positioning signals to be transmitted to and/or received by the UE. The configuring may be based on a UE measurement capability report. The method may comprise, and/or the network node may be adapted for, and/or comprise a receiving module for, receiving a measurement capability report, e.g. from the UE and/or another network node and/or the network. For example, the network (e.g., one of the network nodes, like a Location Server) may provide such a report based on stored data, e.g. a report received from the UE, e.g. via a network node, and/or historical data). The network node may in particular be a base station or eNodeB. It may be considered that the measurement configuration is determined by the network node, and/or received from the network, e.g. another network node, which in particular may be a location server (which may have determined the configuration). Determining the configuration may be based on a measurement capability report, e.g. from the UE.

Additionally or alternatively, there may be considered a method for operating a network node for and/or in a wireless communication network, and/or a network node for a wireless communication network. The method may comprise, and/or the network node may be adapted for, and/or comprise a localization module for, performing localization of a UE based on an adaptable resolution and/or measurement indicator/s from the UE, which may be based on an adaptable resolution. Localization may comprise multilateration. The method may comprise receiving, from the UE and/or from another network node, e.g. an eNodeB, measurement indicator/s, which may be pertaining to positioning signals received and/or measured by the UE (which may be the UE to be localized). The indicator/s may pertain to positioning signals from more than one source, in particular from more than one base station or eNodeB. The network node may be a base station/eNodeB, or a for example location server, which may generally be connected or connectable to communicate with one or more than one eNodeBs, which may be the sources of positioning signals received or to be received by the UE.

Generally, measurement indicator/s and/or other indicators may be part of and/or be provided as part of and/or mapped into and/or implemented as and/or transmitted in a measurement report (or more than one reports).

An exemplary LTE Positioning Architecture is described in the following.

Positioning in LTE is supported by the architecture shown in FIG. 1, where the direct interactions between a user equipment (UE, also referred to as terminal) and a location server (e.g., E-SMLC) may be via the LTE Positioning Protocol (LPP). Moreover, there may be interactions between the location server and the base station (e.g., eNodeB), in particular via the LPPa protocol, which may be supported to some extent by interactions between the eNodeB and the UE via the Radio Resource Control (RRC) protocol. Interactions may generally refer to communication and/or transmission and/or reception of signals and/or messages and/or data.

The Location Server is a physical or logical entity (e.g., E-SMLC or SUPL SLP) that manages positioning for a target device by obtaining measurements and other location information from one or more positioning units and/or eNodeBs and/or UEs (e.g., by receiving measurement indicators) and providing assistance data to positioning units to help determine this. A location server generally may be adapted for localizing one or more UEs. A Location Server may also compute or verify the final location estimate.

The following positioning techniques are considered in LTE (3GPP 36.305):

Enhanced Cell ID (E-CID).

Essentially cell ID information to associate the UE to the serving area of a serving cell, and then additional information to determine a finer granularity position. The E-CID may use one or more radio measurements as part of the additional information. Examples of such measurements are:
UE Rx-Tx time difference;
eNodeB Rx-Tx time difference;
Timing advance measurement (TADV);
RSRP, RSRQ etc.;
Angle of arrival (AoA) measured by the base station.
Assisted GNSS.

GNSS information retrieved by the UE, supported by assistance information provided to the UE from E-SMLC.
OTDOA (Observed Time Difference of Arrival).

The UE estimates the time difference of reference signals from different base stations and sends to the E-SMLC for multilateration. Example of OTDOA measurement performed by UE is reference signal time difference (RSTD). Corresponding measurement data may be provided.
UTDOA (Uplink TDOA).

Figure 2:
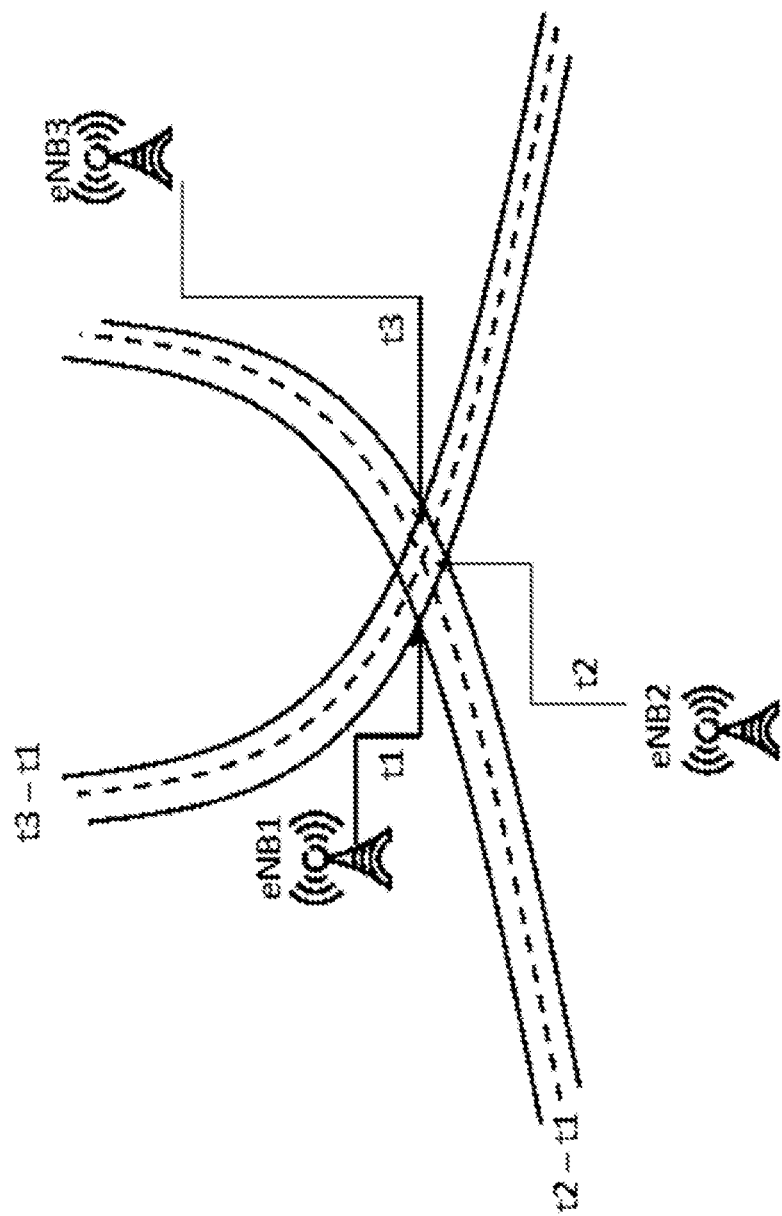
FIG. 2, showing an example of OTDOA position estimation based on multilateration of the RSTD measurements.

The UE is requested to transmit a specific waveform that is detected by multiple location measurement units (e.g. LMU or an eNB or any receiving radio node) at known positions. These measurements are forwarded to E-SMLC for multilateration. Example of UTDOA measurement performed by LMU is UL Relative Time of Arrival (RTOA). The Observed Time Difference Of Arrival (OTDOA) is a UE-assisted method, in which the UE measures the time of arrival (TOA) of specific positioning reference signals (PRS) from multiple eNBs, and computes the relative differences to obtain measurement data. These reference signal time difference (RSTD) are quantized and reported via LPP to the E-SMLC together with an accuracy assessment. Based on known positions of eNBs and their mutual time synchronization, it is possible for the E-SMLC to estimate the UE position from the RSTD and covariance reports using multilateration. The accuracy depends on the radio conditions of the received signals, number of received signals as well as the deployment, which means that it will vary spatially. FIG. 2 illustrates the multilateration in OTDOA while considering eNB1 as the reference cell.

RSTD Measurement Report Mapping is discussed in the following. The UE estimates the time of arrival of a reference cell and other detected cells based on the received assistance information from E-SMLC. Then, the UE computes the Reference Signal Time Difference (RSTD) of each detected cell in relation to the reference cell. The UE signals the RSTD measurement results to the location server (e.g., E-SMLC) using the pre-defined RSTD report mapping as explained below.

In the existing system, the reporting range of RSTD is defined from $-15391$ $T_s$ to $15391$ $T_s$ with $1$ $T_s$ resolution for absolute value of RSTD less or equal to $4096$ $T_s$ and $5$ Ts for absolute value of RSTD greater than $4096$ $T_s$. Ts is a basic time unit; $1$ Ts=$32.44$ ns.

The mapping of measured quantity is defined in Table 9.1.10.3-1 of TS 36.133, Section 9.1.10.3 (table 1).

TABLE 1 pertains to RSTD report mapping:

| Reported Value | Measured Quantity Value | Unit |
|---|---|---|
| RSTD_0000 | $-15391 >$ RSTD | $T_s$ |
| RSTD_0001 | $-15391 \leq$ RSTD $< -15386$ | $T_s$ |

TABLE 1-continued pertains to RSTD report mapping:

| Reported Value | Measured Quantity Value | Unit |
|---|---|---|
| ... | ... | ... |
| RSTD_2258 | −4106 ≤ RSTD < −4101 | $T_s$ |
| RSTD_2259 | −4101 ≤ RSTD < −4096 | $T_s$ |
| RSTD_2260 | −4096 ≤ RSTD < −4095 | $T_s$ |
| RSTD_2261 | −4095 ≤ RSTD < −4094 | $T_s$ |
| ... | ... | ... |
| RSTD_6353 | −3 ≤ RSTD < −2 | $T_s$ |
| RSTD_6354 | −2 ≤ RSTD < −1 | $T_s$ |
| RSTD_6355 | −1 ≤ RSTD ≤ 0 | $T_s$ |
| RSTD_6356 | 0 < RSTD ≤ 1 | $T_s$ |
| RSTD_6357 | 1 < RSTD ≤ 2 | $T_s$ |
| RSTD_6358 | 2 < RSTD ≤ 3 | $T_s$ |
| ... | ... | ... |
| RSTD_10450 | 4094 < RSTD ≤ 4095 | $T_s$ |
| RSTD_10451 | 4095 < RSTD ≤ 4096 | $T_s$ |
| RSTD_10452 | 4096 < RSTD ≤ 4101 | $T_s$ |
| RSTD_10453 | 4101 < RSTD ≤ 4106 | $T_s$ |
| ... | ... | ... |
| RSTD_12709 | 15381 < RSTD ≤ 15386 | $T_s$ |
| RSTD_12710 | 15386 < RSTD ≤ 15391 | $T_s$ |
| RSTD_12711 | 15391 < RSTD | $T_s$ |

UE Rx-Tx time difference measurement Report mapping is described in the following.

Generally, the reported value may be considered a measurement indicator. The measurement data (measured quantity value) is mapped to such indicator using the table.

In the existing system, the UE signals the RSTD measurement results to the location server using the pre-defined RSTD report mapping as explained below. The reporting range of UE Rx-Tx time difference is defined from 0 to 20472 $T_s$ with 2 $T_s$ resolution for UE Rx-Tx time difference less than 4096 $T_s$ and 8 Ts for UE Rx-Tx time difference equal to or greater than 4096 $T_s$. The mapping of measured quantity is defined in Table 9.1.9.2-1 of TS 36.133.

TABLE 2 pertains to UE Rx-Tx time difference measurement report mapping.

| Reported value | Measured quantity value | Unit |
|---|---|---|
| RX-TX_TIME_DIFFERENCE_0000 | $T_{UE\ Rx-Tx} < 2$ | $T_s$ |
| RX-TX_TIME_DIFFERENCE_0001 | $2 \leq T_{UE\ Rx-Tx} < 4$ | $T_s$ |
| RX-TX_TIME_DIFFERENCE_0002 | $4 \leq T_{UE\ Rx-Tx} < 6$ | $T_s$ |
| ... | ... | ... |
| RX-TX_TIME_DIFFERENCE_2046 | $4092 \leq T_{UE\ Rx-Tx} < 4094$ | $T_s$ |
| RX-TX_TIME_DIFFERENCE_2047 | $4094 \leq T_{UE\ Rx-Tx} < 4096$ | $T_s$ |
| RX-TX_TIME_DIFFERENCE_2048 | $4096 \leq T_{UE\ Rx-Tx} < 4104$ | $T_s$ |
| RX-TX_TIME_DIFFERENCE_2049 | $4104 \leq T_{UE\ Rx-Tx} < 4112$ | $T_s$ |
| ... | ... | ... |
| RX-TX_TIME_DIFFERENCE_4093 | $20456 \leq T_{UE\ Rx-Tx} < 20464$ | $T_s$ |
| RX-TX_TIME_DIFFERENCE_4094 | $20464 \leq T_{UE\ Rx-Tx} < 20472$ | $T_s$ |
| RX-TX_TIME_DIFFERENCE_4095 | $20472 \leq T_{UE\ Rx-Tx}$ | $T_s$ |

Herewith, the time difference is mapped to a time difference indicator.

RSRP Measurement Report Mapping is discussed in the following.

In the existing system, the reporting range of RSRP is defined from −140 dBm to −44 dBm with 1 dB resolution. The mapping of measured quantity is defined in Table 9.1.4-1 of TS 36.133 Section 9.1.4.

TABLE 3 pertains to RSRP measurement report mapping

| Reported value | Measured quantity value | Unit |
|---|---|---|
| RSRP_00 | RSRP < −140 | dBm |
| RSRP_01 | −140 ≤ RSRP < −139 | dBm |
| RSRP_02 | −139 ≤ RSRP < −138 | dBm |
| ... | ... | ... |
| RSRP_95 | −46 ≤ RSRP < −45 | dBm |
| RSRP_96 | −45 ≤ RSRP < −44 | dBm |
| RSRP_97 | −44 ≤ RSRP | dBm |

The accuracy of the position estimation depends significantly on the quality and accuracy of the runtime reports and/or measured RSTDs sent from the UE to the E-SMLC.

The typical bandwidth of the Positioning Reference Signal (PRS) used in OTDOA system in practice has been less than 20 MHz (100 RBs) e.g. 10 MHz (50 RBs) or lower. Therefore, RSTD accuracy has been the same for PRS BW≥50 RBs, There is however interest to widen the bandwidth (BW) of the Positioning Reference Signal e.g. to 20 MHz (100 RBs of PRS signals). That would provide more positioning symbols within each sub-frame, and thereby enable better performance of a PRS based positioning measurements e.g. RSTD. Therefore recently the RSTD accuracy has been enhanced for all and especially for PRS BWs of 75 RBs and 100 RBs (RB=Resource Block).

In addition to larger PRS BW, enhanced UE receiver implementation can further enhance the RSTD measurement accuracies therefore increasing the UE actual positioning accuracy.

Currently the RSTD reporting resolution of 1 Ts is defined in the standard; 1 Ts (32.44 ns) corresponds to about 9.8 meters (traveled by the radio wave at the speed of light). Therefore the RSTD performance is considerably restricted by the current RSTD quantization resolution (reporting granularity) of 1 Ts, especially for UEs receiving PRS from small cell eNBs. In order to fully benefit from enhancement of RSTD positioning accuracy (i.e. by virtue of larger PRS BW and/or UE receiver improvement) the RSTD quantization resolution may also have to be enhanced e.g. to reporting granularity of 0.5 $T_s$ or even 0.25 Ts.

The arguments described above for RSTD are also valid for other positioning schemes e.g. E-CID UE Rx-Tx time difference measurement. The arguments described above for RSTD are in general valid for any type of radio measurements (e.g. UE DRS based measurements), which are reported by the UE to a network node for UE position estimation. On the other hand, increased quantization resolution leads to signaling overhead, which can be significant in particular for multilateration, which requires communication with multiple positioning signal sources.

The use of finer resolution in the reporting range of a measurement however also leads to larger signaling overheads. Therefore a suitable solution, which enables good compromise between overheads and overall accuracy, is needed.

Using a proposed solution, a UE determines a measurement reporting range (i.e. selects one of two or more pre-defined ranges) based on one or more measurement configuration parameters on which it does measurements and transmits measurement results to network or a network node using the determined measurement reporting range.

For the OTDOA technique, as an example, a proposed solution provides method and apparatus to adapt the RSTD measurement report mapping based on OTDOA configuration such as PRS bandwidth, which may be based on RSTD accuracy depending on PRS BW.

Similarly, for the E-CID technique, as an example, a proposed solution provides method and apparatus to adapt the UE Rx-Tx time difference measurement accuracy based on E-CID configuration such as CRS transmission bandwidth since UE Rx-Tx time difference measurement accuracy depends on CRS transmission BW.

In yet another example the proposed solution provides method and apparatus to adapt the measurement accuracy of discovery signal measurements (e.g. RSRP, RSRQ, CSI-RSRP etc) based on measurement configuration such as measurement bandwidth and/or periodicity of discovery signals since signal measurement accuracy depends on measurement BW, periodicity of discovery signals etc.

As a result the measurement report in the above example can be generated and signaled with high efficiency and accuracy.

Actions performed in a UE may comprise:
Performing at least one measurement using one or more measurement configuration and/or corresponding measurement configuration parameters; and/or
Determining one out of a plurality of measurement report mappings and/or accuracy and/or resolution based on at least one parameter related to the measurement configuration used by the UE for performing the measurement and/or mapping measurement data, e.g. obtained based on measurements (e.g., by further processing), to measurement indicators based on such a mapping, which may be based on an adaptable resolution; and/or
Transmitting results of at least one performed measurement to a network node by using the determined measurement report mapping and/or accuracy and/or resolution, which may comprise and/or be implemented by transmitting the measurement indicator/s.

If the UE has low or lower capability (e.g., its measurement capability is not sufficient to provide the higher resolution and/or for the higher resolution mapping), such as lower sampling rate or smaller reception bandwidth, then lower resolution (e.g., 1 Ts) may be assumed, and/or mapping and/or transmitting may generally be adapted accordingly.

If the UE has high or higher capability (e.g., its measurement capability is sufficient to provide the higher resolution and/or for the higher resolution mapping, then higher resolution (e.g., 0.5 Ts) may assumed in the measurement report, in particular unless explicitly configured otherwise.

Actions performed in a network node may comprise:
Determining one out of a plurality of measurement report mappings based on at least one parameter related to a measurement configuration being used or expected to be used by a UE for performing one or more measurements, and/or configuring the UE accordingly; and/or
Receiving from the UE, using the determined measurement report mapping (or configuration), the results of at least one measurement performed by the UE and/or one or more corresponding measurement indicators.

The proposed solution allows in particular for OTDOA to provide a flexible and adaptive RSTD measurement report according to the circumstances the UE in. The adaptation is accomplished based on OTDOA configuration parameters, without explicit signaling.

In general, the method can be applied to any kind of measurement whose measurement performance (e.g. measurement accuracy) depends on at least one parameter used for doing the measurement e.g. BW, periodicity of reference signals, density of reference signals etc.

The method provides a good compromise between the signaling overheads associated with the measurement report and the measurement accuracy of the measurement actually received at the network node.

In some embodiments the non-limiting term network node (also interchangeably called as node) is more commonly used and it refers to any type of network node which directly or indirectly communicates with the UE. It can be radio network node or a node in a core network or fixed part of the network. For example it can be a network node serving the UE, a network node neighboring to the serving network node of the UE, any network node in the radio network or in the core network in wireless communication system in which UE operates. Examples of network nodes are base station (BS), multi-standard radio (MSR) radio node such as MSR BS, eNode B, network controller, radio network controller, base station controller, relay, donor node controlling relay, base transceiver station (BTS), access point (AP), core network node (e.g. MSC, MME etc), O&M, OSS, SON, location server (e.g. E-SMLC), MDT etc.

In some embodiments the non-limiting term user equipment (UE) is used and it refers to any type of wireless device or terminal adapted for communicating or communicating with a network node in a cellular or mobile communication system over radio interface. Examples of UE are target device, device to device (D2D) UE, proximity-based service (ProSe) UE, machine type UE or UE capable of machine to machine communication (aka category 0 UE, low cost and/or low complexity UE), PDA, iPAD, Tablet, mobile terminals, smart phone, laptop embedded equipped (LEE), laptop mounted equipment (LME), USB dongles, wireless device etc.

The embodiments are described for LTE. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc.

The embodiments are applicable for any type of one or more measurements (aka radio measurement) performed by the UE on any one or combination of reference signals (RS) in uplink and/or downlink.

The measurement can be performed by the UE on one or more serving cells and/or on one or more neighbor cells. The measurement can also be performed on reference signals transmitted by one or more transmission points (TPs) within the same cell, which can be a serving or neighbor cell. Therefore one or more measurements done on a cell or a network node may also be interchangeably called as measurements done on the transmission point (TP) or signals of the TP. The TP can be serving or neighboring TP. A TP is interchangeably called as remote radio head (RRH) and remote radio unit (RRU). The cells can be on the serving or non-serving carriers. Examples of serving carriers are PCC and SCC in carrier aggregation (CA) aka multi-carrier, PCC, PSCC and SCC in dual connectivity (DC). Examples of non-serving carriers are inter-frequency carriers, inter-RAT carriers etc. The measurements on non-serving carriers can be done using measurement gaps or without measurement gaps.

Examples of DL reference signals are PSS, SSS, CRS, CSI-RS, PRS etc. Examples of UL reference signals are SRS, DMRS etc. Reference signals are also interchangeably called as discovery signals.

The discovery signals can be transmitted in a cell in a discovery occasion with some periodicity aka discovery occasion periodicity. The discovery occasion may contain certain number of subframes with discovery signals (e.g. between 1-6 subframes). Examples of discovery occasion periodicity are 40 ms, 80 ms and 160 ms. Examples of PRS occasion periodicity are 160 ms, 320 ms, 640 ms and 1280 ms.

Examples of measurements which can be performed by the UE on DL and/or UL reference signals are cell search aka cell identification, RSRP, RSRQ, RS-SINR, CRS-SINR, CSI-RSRP, CSI-RSRQ, sidelink RSRP (S-RSRP), CQI, CSI, UE Rx-Tx time difference, SINR, DRS-SINR etc.

In some embodiments a term, "DRS occasion" or simply a broader term 'reference signal occasion' is used. The DRS occasion may also be called as discovery signal occasion, discovery signal transmission occasion, discovery occasion reference signal occasion, positioning occasion, PRS occasion etc. The DRS occasion comprises of one or more time resources. The time resource can be a time slot, subframe, symbol, frame, transmission time interval (TTI), interleaving time etc.

The UE may also obtain a measurement configuration, which comprises of at least one parameter used by the UE for doing measurements. Examples of parameters which can be included in the measurement configuration are measurement BW, cell BW, measurement time or period, number of samples to be used for measurement in the measurement time, reference signal related configuration parameters (e.g. RS BW, RS measurement BW, number of time resources in RS occasion, RS occasion periodicity, reference time to start RS configuration etc). The measurement configuration is also interchangeably called as measurement object, assistance data, assistance information etc. The information about the parameters in the measurement configuration can be obtained by the UE based on one or more of the following means:

By receiving from the network node;
Autonomously determined by the UE;
One or more pre-defined rules;
By receiving from another UE;
Any combination of the above means.

The UE also has to meet one or more pre-defined UE requirements related to the UE measurements. The UE requirement is also interchangeably called as measurement requirements, measurement requirements, RRM requirements, mobility requirements, positioning measurement requirements etc. The UE may have to adapt one or more measurement procedures in order to meet one or more pre-defined UE requirements. Examples of UE requirements related to UE measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, CGI acquisition delay etc.

The UE after performing one or more measurements may use them for one or more radio operation tasks. Examples of such tasks are:

Performing cell change. Examples of cell change are handover, cell selection, cell reselection, RRC connection release with redirection etc;
Using the measurement results for determining the UE position;
Transmitting the measurement results to the network node. The UE may send the results using one or more of the following mechanism: periodically, event triggered basis and event triggered periodic basis;
Transmitting the measurement results to another UE if the UEs are device to device (D2D) capable (respectively UEs capable of proximity services (ProSe)). The UE may send the results using one or more of the following mechanism: periodically, event triggered basis and event triggered periodic basis;

The last two radio operational tasks require the UE to transmit the measurement results using a measurement report mapping. The measurement report mapping is also interchangeably called as simply report mapping, measurement reporting range, reportable measurement values, measurement signaling range, measurement signaling mapping etc. It is assumed that at least two different measurement report mappings are pre-defined for the same type of measurement for enabling the UE to signal the measurement results to at least one particular type of node e.g. one set of mappings for reporting to network node, another set of mappings for reporting to another UE etc. The measurement report mappings differ by at least one report mapping specific parameter. Examples of such parameters are resolution of reportable values (aka granularity), number of possible reportable values, minimum and maximum reportable values etc. For example at least the two sets of report mappings for each type of measurement can be defined as explained in the following examples:

At least a first RSTD report mapping and a second RSTD report mapping for transmitting the RSTD measurements to one or more network nodes (e.g. location server etc);
At least a first UE Rx-Tx time difference measurement report mapping and a second UE Rx-Tx time difference measurement report mapping for transmitting the UE Rx-Tx time difference measurements to one or more network nodes (e.g. location server, eNode B etc);
At least a first RSRP report mapping and a second RSRP measurement report mapping for transmitting the RSRP measurements to one or more network nodes (e.g. location server, eNode B etc);
At least a first RSRQ report mapping and a second RSRQ measurement report mapping for transmitting the RSRQ measurements to one or more network nodes (e.g. location server, eNode B etc);
At least a first CSI-RSRP report mapping and a second CSI-RSRP measurement report mapping for transmitting the CSI-RSRP measurements to one or more network nodes (e.g. location server, eNode B, RRH etc);
At least a first S-RSRP report mapping and a second S-RSRP measurement report mapping for transmitting the S-RSRP measurements to one or more UEs (e.g. ProSe UE etc);

According to one approach, the UE determines one out of a plurality of pre-defined measurement report mappings based on at least one parameter related to the measurement configuration used by the UE for performing the measurement, which the UE intends to transmit to the network node and/or another UE. The UE then uses the determined measurement report mapping to transmit the results of at least one performed measurement to the network node and/or another UE. When the UE reports the measurement to another UE (i.e., a peer node) via a sidelink, the peer node can either estimate the UE's position, or forward the measurement report to the location server on behalf of the UE so that the location server can estimate.

Non-limiting examples of parameters in the measurement configuration that can be used by the UE for determining the measurement report mapping are:

- The bandwidth of the reference signal: The reference signal can be any type that the UE uses to perform measurements on, including:
  PRS;
  CRS;
  DRS;
  SRS;
- Measurement BW e.g. minimum allowed measurement BW, PRS BW etc.
- Cell bandwidth; BW of a measured cell, BW of a serving cell etc.
- BW of a signal as a function of two or more other BWs e.g. minimum of serving cell BW and neighbor cell BW, minimum of serving cell BW and measured cell BW, minimum of serving cell BW and PRS BW etc
- Number of consecutive subframes available for measurement in a measurement occasion;
- Periodicity of subframes in a measurement occasion configured for measurement;
- Inter-frequency measurement vs intra-frequency measurement;
- Channel quality or signal strength, such as RSRP, RSRQ;

The one or more parameters to be used for determining the measurement report mapping can be selected based on one or more UE requirements of the measurement which is to be transmitted by the UE to the network node and/or another UE. Examples of such UE requirements are measurement accuracy, measurement reliability, signal levels down to which the measurement is performed etc.

In some embodiments the network node may configure the UE whether or not the UE is allowed to adapt or select one of the plurality of pre-defined report mappings for the purpose of transmitting the measurement results. In some embodiments the network node may configure the UE one or more parameters in the measurement configuration that the UE is allowed or the UE is required to use for adapting or selecting one of the plurality of pre-defined report mappings for the purpose of transmitting the measurement results. For example the UE may be configured to adapt the report mapping based on PRS BW for RSTD, measurement BW for RSRP/RSRQ and CRS BW for UE Rx-Tx time difference measurement etc. The parameters to be used for adapting the report mapping for different types of measurements can also be governed by one or more pre-defined rules. The UE based on these received configuration and/or pre-defined rules, may decide whether or not to adapt the report mapping and which parameters to use for adapting if the adapting is allowed.

The idea of adapting the measurement report mapping based on one or more measurement configuration parameters can also be applicable to any type of network node which performs and reports the measurement to another node. For example a network node (e.g. base station) may perform one or more measurement (e.g. UL SINR, eNB Rx-Tx time difference, TA, UL signal strength etc), may determine one of the plurality of measurement report mappings based on one or more parameters (e.g. measurement BW) in the measurement configuration and may transmit the results of the performed measurement to another network node and/or one or more UEs. Therefore the ideas described in the embodiments related to the UE measurements can also be applicable for a network node performing and reporting measurements to another node.

In the following sections there are described three different embodiments for three different specific categories of UE measurements. The general methodology is however applicable for any type or category of measurements which can be reported by the UE to the network node and/or another UE or which can be reported by the network node to another network node and/or one or more UEs.

Variant 1: Adaptive RSTD Reporting for OTDOA

For OTDOA, the UE can adapt the RSTD measurement report mapping by selecting one out of the plurality of the pre-defined mappings based on based one or several of OTDOA configuration parameters. While each configuration parameter is discussed individually below, the adaptation can be used on a combination of two or more parameters. The parameters to be used by the UE for the adaptation of the RSTD report mapping can be based on pre-defined information, information received from the network node, autonomous decision by the UE or any combination thereof.

In one example, the UE can adapt or determine the RSTD measurement mapping according to the PRS bandwidth. This parameter is signalled via LPP from the E-SMLC to the UE using the field "prs-Bandwidth." For example the UE can use the first (legacy) RSTD reporting range (i.e. 1 Ts resolution) when PRS BW=1.4 MHz (6 RBs) or 3 MHz (15 RBs). But it uses the second (new) reporting range (i.e. 0.5 Ts resolution) when PRS BW>3 MHz (15 RBs). This is because the measurement accuracy for smaller BW is quite coarse; therefore tighter resolution will not help much. For example the RSTD accuracies for PRS BW=1.4 MHz (6 RBs) and for PRS BW=5 MHz (25 RBs) are ±15 Ts and ±6 Ts respectively. In another example the RSTD accuracies for PRS BW=3 MHz (15 RBs) and for PRS BW=20 MHz (100 RBs) are ±10 Ts and ±4 Ts respectively. Therefore this approach will reduce signaling overheads when PRS BW≥3 MHz (15 RBs).

In yet another exemplary embodiment the RSTD measurement report mapping for transmitting the RSTD can be adapted or determined based on a true measurement BW which in turn is a function of at least PRS BW and one or more parameter related to BW. Examples of such functions are minimum, maximum, average etc. An example the true measurement BW (Measurement $BW_{True}$) can be as follows:

Measurement $BW_{True}$=MINIMUM (serving cell channel bandwidth, PRS bandwidth of the reference cell, PRS BW of a measured neighbour cell).

For example the UE can use the first RSTD reporting range (i.e. 1 Ts resolution) when the measurement $BW_{True}$≤15 RBs and can use the second RSTD reporting range (i.e. 0.5 Ts resolution) when the measurement $BW_{True}$>15 RBs.

In another example, the UE can adapt the RSTD measurement accuracy according to the number of consecutive downlink subframes $N_{PRS}$ with positioning reference signal. This parameter is signalled via LPP from the E-SMLC to the UE using the field "numDL-Frames," where $N_{PRS}$ can be 1, 2, 4, or 6 consecutive subframes. The UE can use the first RSTD reporting range with coarser resolution (e.g., 1 Ts resolution) when $N_{PRS}$ is small (e.g., $N_{PRS}$=1, 2), and the UE can use the second RSTD reporting range with finer resolution (e.g., 0.5 Ts resolution) when $N_{PRS}$ is large (e.g., $N_{PRS}$=6). This is because when $N_{PRS}$ is small the RSTD accuracy is worse (e.g. ±10 Ts) compared to the RSTD accuracy (e.g. ±4 Ts) when $N_{PRS}$ is large.

In another example, the UE can adapt the RSTD measurement accuracy according to the PRS periodicity. This parameter is signalled via LPP from the E-SMLC to the UE using the field "prs-ConfigurationIndex". The PRS configuration Index $I_{PRS}$ is mapped to PRS periodicity $T_{PRS}$ and PRS subframe offset $\Delta_{PRS}$. The PRS periodicity $T_{PRS}$ can be of {160, 320, 640, 1280} subframes. The UE can use the first (low) resolution RSTD reporting range (e.g., 1 Ts resolution) when $T_{PRS}$ is large (e.g., $T_{PRS}$=640, 1280 (subframes)), and the UE can use the second (high resolution) RSTD reporting range (e.g., 0.5 Ts resolution) when $T_{PRS}$ is small (e.g., $T_{PRS}$=160, 320). This is because when $T_{PRS}$ is long the RSTD accuracy is worse (e.g. ±10 Ts) compared to the RSTD accuracy (e.g. ±4 Ts) when $T_{PRS}$ is short.

In yet another example, the UE can adapt the RSTD measurement accuracy according to the inter-frequency vs intra-frequency measurement. The UE can use low resolution RSTD reporting (e.g., 1 Ts resolution) when inter-frequency measurement is used between the reference cell and the neighbor cell. Conversely, the UE can use high resolution RSTD reporting (e.g., 0.5 Ts resolution) when intra-frequency measurement is used between the reference cell and the neighbor cell. This is because intra-frequency RSTD accuracy is better (e.g. ±5 Ts for PRS BW=50 RBs) compared to the inter-frequency RSTD accuracy (e.g. ±9 Ts for PRS BW=50 RBs).

The UE after selecting the RSTD report mapping based on one or more measurement configuration parameters, uses the selected mapping to transmit the results of the measurement reports to the network node e.g. to E-SMLC.

Variant 2: Adaptive UE Rx-Tx Time Difference Reporting for E-CID

For E-CID, the UE can adapt the UE Rx-Tx time difference report mapping by selecting one out of the plurality of the pre-defined mappings based on one or several of E-CID measurement configuration parameters. While each configuration parameter is discussed individually below, the adaptation can be used on a combination of two or more parameters. The parameters to be used by the UE for the adaptation of the E-CID measurement report mapping can be based on pre-defined information, information received from the network node, autonomous decision by the UE or any combination thereof.

In one example, the UE can adapt the UE Rx-Tx time difference measurement report mapping according to the cell specific reference signals (CRS) bandwidth of the serving cell (e.g. PCell, SCell, PSCell etc) on which measurement is done. This is also the DL system bandwidth of the primary cell. For example the UE can use the first (legacy) UE Rx-Tx time difference measurement reporting range (i.e. 1 Ts resolution) when CRS BW=1.4 MHz or 3 MHz. But it uses the second (new) UE Rx-Tx time difference measurement reporting range (i.e. 0.5 Ts resolution) when CRS BW>3 MHz.

In another example, the UE can adapt the UE Rx-Tx time difference measurement report mapping according to the sounding reference signals (SRS) bandwidth of signals transmitted by the UE in the serving cell (e.g. PCell, SCell, PSCell etc) on which measurement is done. The UE Rx-Tx time difference measurement is done on both UL reference signal (e.g. SRS, DMRS) and DL reference signal (e.g. CRS), where DL reference signal is used in estimating Rx time, and UL reference signal is used in timing advance derivation and consequently affects UE transmit timing (i.e., Tx Time). For example the UE can use the first (legacy) UE Rx-Tx time difference measurement reporting range (i.e. 1 Ts resolution) when SRS BW=1.4 MHz or 3 MHz. But it uses the second (new) UE Rx-Tx time difference measurement reporting range (i.e. 0.5 Ts resolution) when SRS BW>3 MHz.

Similar to PRS, the measurement accuracy for smaller BW is quite course, thus legacy reporting range is sufficient. When the measurement accuracy is improved due to higher BW, tighter resolution will help to improve UE positioning accuracy. Therefore in both the above approaches will improve UE positioning accuracy while keeping the signaling overhead low.

In another example, the UE can adapt the UE Rx-Tx time difference measurement report mapping according to the measured RSRP and RSRQ result. These parameters are reported by UE to E-SMLC via two parameters "rsrp-Result" and "rsrq-Result". The UE can use the first (low resolution) UE Rx-Tx time difference measurement report mapping (e.g., 1 Ts resolution) when RSRP and/or RSRQ accuracy result is poor (e.g., rsrq-Result≤−14 dB and/or rsrp-Result≤−95 dBm). Conversely, the UE can use high resolution measurement report mapping (e.g., 0.5 Ts resolution) when RSRP and/or RSRQ measurement result is high (e.g., RSRP rsrq-Result>−14 dB and/or rsrp-Result>−95 dBm).

The UE after selecting the UE Rx-Tx time difference measurement report mapping based on one or more measurement configuration parameters, uses the selected mapping to transmit the results of the measurement reports to one or more network nodes e.g. to E-SMLC via LPP, to eNode B via RRC, to base station etc.

Variant 3: Adaptive Signal Quality Measurements Reporting

In the ECID method, in addition to UE Rx-Tx timing difference, signal quality measurements are also reported by the UE to the location server via the LPP. Two fields of IE ECID-SignalMeasurementInformation are shown below for the LPP. Here rsrp-Result is a field that specifies the reference signal received power (RSRP) measurement, and rsrq-Result is a field that specifies the reference signal received quality (RSRQ) measurement. Both RSRP and RSRQ reporting can be adaptive according to one or more configuration parameters that affects measurement quality. In the following, RSRP adaptation is discussed as an example, with the understanding that similar adaptive reporting can be applied to RSRQ.

| rsrp-Result | INTEGER (0..97) | OPTIONAL, |
|---|---|---|
| rsrq-Result | INTEGER (0..34) | OPTIONAL, |
| ue-RxTxTimeDiff | INTEGER (0..4095) | OPTIONAL, |

A DRS based measurement can be done on one or more discovery reference signals (e.g. CRS, CSI-RS etc). The UE can adapt the DRS based measurement (e.g. RSRP, CSI-RSRP etc) report mapping by selecting one or the plurality of the pre-defined mappings based on one or several of DRS configuration parameters. While each configuration parameter is discussed individually below, the adaptation can be used on a combination of two or more parameters. The parameters to be used by the UE for the adaptation of the DRS based measurement report mapping can be based on pre-defined information, information received from the network node, autonomous decision by the UE or any combination thereof.

For example, if RSRP measurement is done over a smaller measurement BW (e.g. measurement BW≤3 MHz) then the UE uses a first report mapping. Otherwise if the measurement BW is larger (e.g. if measurement BW>3 MHz) then the UE uses a second report mapping for transmitting the RSRP measurement results to the network node. This is because the RSRP measurement accuracy for smaller measurement BW (e.g. measurement BW≤3 MHz) is worse than that done using the larger measurement BW (e.g. measurement BW>3 MHz).

In another example, if RSRP measurement is done over fewer DRS subframes (e.g. 1 or 2) in a DRS occasion then the UE uses a first report mapping otherwise the measurement is done over larger number of DRS subframes (e.g. 3 or more) then the UE uses a second report mapping for transmitting the RSRP measurement results to the network node. This is because the RSRP measurement accuracy becomes better when a larger number of DRS subframes are used for the RSRP measurement. As an example RSRP accuracy in the range of ±2 dB is considered to be better than the RSRP accuracy in the range of ±6 dB.

In the above examples, it is assumed that the first report mapping has a coarser resolution (e.g. 1 dB) compared to that of the second reporting mapping (e.g. 0.25 dB).

The UE, after selecting the UE DRS based measurement report mapping based on one or more measurement configuration parameters, uses the selected mapping to transmit the results of the measurement reports to one or more network nodes e.g. to eNodeB, to base station, to RRH etc.

There is generally disclosed a general protocol to efficiently quantize RSTD measurements. The protocol is based on an enhanced quantization method that has various degrees of freedom to be optimized, under different scenarios and settings. The enhanced quantization method can be supported by addition signaling (and/or configuring) from the location server (e.g. E-SMLC) to the UE as well as optional signaling from the UE to the location server, which may be required for decoding RSTD quantized reports at the location server. The same idea can be applied for E-CID measurement report and can also be generalized for any other type of measurement reporting.

Figure 3:
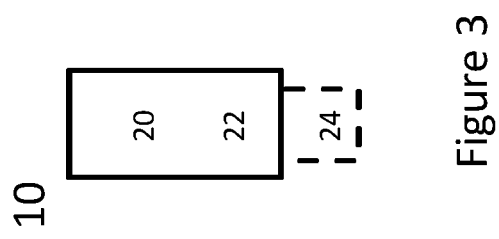
FIG. 3, showing an exemplary terminal.

FIG. 3 schematically shows a terminal 10, which may be implemented in this example as a user equipment. Terminal 10 comprises control circuitry 20, which may comprise a controller connected to a memory. Any of the modules of a terminal described herein may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry. Modules of a terminal as described herein may be implemented in software and/or hardware and/or firmware in corresponding circuitry.

Figure 4:
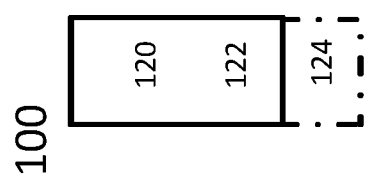
FIG. 4, showing an exemplary network node.

FIG. 4 schematically shows a network node or base station 100, which in particular may be an eNodeB. Network node 100 comprises control circuitry 120, which may comprise a controller connected to a memory. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. Modules of a network node as described herein may be implemented in software and/or hardware and/or firmware in corresponding circuitry.

Some useful abbreviations comprise:

| Abbreviation | Explanation |
| --- | --- |
| E-SMLC | Evolved-Serving Mobile Location Centre |
| OTDOA | Observed Time Difference of Arrival |
| PRS | Positioning Reference Signal |
| RSTD | Reference Signal Time Difference |
| TDOA | Time Difference of Arrival |
| TOA | Time of Arrival |
| DRS | Discovery reference signal |
| RSRP | Reference Signal Received Power |
| CSI | Channel State Information |
| CA | Carrier aggregation |
| CC | Component carrier |
| MAC | Media access control |
| MME | Mobility management entity |
| OFDM | Orthogonal frequency division multiplexing |
| PCC | Primary component carrier |
| PRS | Positioning reference signals |
| PCI | Physical cell identity |
| PCell | Primary Cell |
| PSCell | Primary SCell |
| PSC | Primary serving cell |
| PSS | Primary synchronization signal |
| RAT | Radio Access Technology |
| RF | Radio frequency |
| RLM | Radio link monitoring |
| RNC | Radio Network Controller |
| RRC | Radio resource control |
| RRH | Remote radio head |
| RRU | Remote radio unit |
| RSRP | Reference Signal Received Power |
| RSRQ | Reference Signal Received Quality |
| RSSI | Received signal strength indication |
| RSTD | Reference signal time difference |
| SCC | Secondary component carrier |
| SCell | Secondary Cell |
| Rx | Receiver, receiver circuitry, receiver-sided |
| Tx | Transmitter, transmitter circuitry, transmitter-sided |
| GNSS | Global Navigation Satellite System, e.g. GPS or Galileo or GLONASS |

These and other abbreviations may be used according to LTE standard definitions, where appropriate.

There may be considered a network node adapted for performing any one of the methods for operating a network node described herein and/or for configuring a terminal as described herein.

There may be considered a terminal adapted for performing any one of the methods for operating a terminal described herein and/or for performing bundling as described herein, in particular according to a configuration configured by a network or network node or system.

There is also disclosed a program product comprising code executable by control circuitry, the code causing the control circuitry to carry out and/or control any one of the method for operating a terminal or network node as described herein, in particular if executed on control circuitry, which may be control circuitry of a terminal or a network node as described herein.

Moreover, there is disclosed a storage medium or carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A terminal being configured with a cell and/or carrier may be or be brought in a state in which it may communicate (transmit and/or receive data) using the cell or carrier, e.g. being registered with the network for communication and/or being synchronized to the cell and/or carrier.

Generally, a node being connected or connectable to a terminal with and/or via a cell or carrier may be adapted for communicating and/or communicate with the terminal using this cell or carrier and/or comprise a corresponding communication link. A terminal being connected or connectable to a network with a cell or carrier may be adapted for communicating and/or communicate with the terminal using this cell or carrier. Connection to a network may refer to connection to at least one node of the network.

Data may refer to any kind of data, in particular any one of and/or any combination of control data or user data or payload data. Control data may refer to data controlling and/or scheduling and/or pertaining to the process of data transmission and/or the network or terminal operation.

Receiving or transmitting on a cell or carrier may refer to receiving or transmitting utilizing a frequency (band) or spectrum associated to the cell or carrier.

A wireless communication network may comprise at least one network node, in particular a network node as described herein. A terminal connected or communicating with a network may be considered to be connected or communicating with at least one network node, in particular any one of the network nodes described herein.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminals connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a terminal and/or user equipment and/or base station and/or relay node and/or any device generally adapted for communication in a wireless communication network, in particular cellular communication.

A cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A terminal may be implemented as a mobile terminal and/or user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/or control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Generally, a terminal may be adapted for MTC (machine-type communication). Such a terminal may be implemented as or associated to a sensor/sensor arrangement and/or smart device and/or lighting/lighting arrangement and/or remotely controlled and/or monitored device (e.g., smart-meter).

A network node may be a base station, which may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA.

Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, e.g. according to an LTE standard. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for cellular communication between two nodes or terminals of a wireless communication network, in particular two user equipments.

It may be considered for cellular communication there is provided at least one uplink (UL) connection and/or channel and/or carrier and at least one downlink (DL) connection and/or channel and/or carrier, e.g. via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands. A network node, e.g. a base station or eNodeB, may be adapted to provide and/or define and/or control one or more cells, e.g. a PCell and/or a LA cell.

A network node, in particular a base station, and/or a terminal, in particular a UE, may be adapted for communication in spectral bands (frequency bands) licensed and/or defined for LTE. In addition, a network node, in particular a base station/eNB, and/or a terminal, in particular a UE, may be adapted for communication in freely available and/or unlicensed/LTE-unlicensed spectral bands (frequency bands), e.g. around 5 GHz.

Configuring a terminal or wireless device or node may involve instructing and/or causing the wireless device or node to change its configuration, e.g. at least one setting and/or register entry and/or operational mode. A terminal or wireless device or node may be adapted to configure itself, e.g. according to information or data in a memory of the terminal or wireless device. Configuring a node or terminal or wireless device by another device or node or a network may refer to and/or comprise transmitting information and/or data and/or instructions to the wireless device or node by the other device or node or the network, e.g. allocation data and/or scheduling data and/or scheduling grants. Configuring a terminal may include sending allocation data to the terminal indication which modulation and/or encoding to use. A terminal may be configured with and/or for scheduling data and/or to use, e.g. for transmission, scheduled and/or allocated uplink resources, and/or, e.g. for reception, scheduled and/or allocated downlink resources. Uplink resources and/or downlink resources may be scheduled and/or provided with allocation or configuration data.

A modulation of and/or modulating HARQ/ACK information/feedback may include an encoding and/or performing encoding. Allocation data configuring or indicating a modulation may include an indication which encoding to use for HARQ/ACK information/feedback. The term modulation may be used to refer to data (e.g. allocation data) representing and/or indicating the modulation used and/or to be used by a terminal.

A wireless communication network may comprise a radio access network (RAN), which may be adapted to perform according to one or more standards, in particular LTE, and/or radio access technologies (RAT).

A network device or node and/or a wireless device may be or comprise a software/program arrangement arranged to be or executable by a hardware device, e.g. control circuitry, and/or storable in a memory, which may provide the described functionality and/or corresponding control functionality.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation or network node, may be adapted to determine and/or transmit corresponding allocation data indicating release or de-allocation of resources to one or more wireless devices, in particular to a first wireless device.

Allocation data may be considered to be data scheduling and/or indicating and/or granting resources allocated by the controlling or allocation node, in particular data identifying or indicating which resources are reserved or allocated for communication for a wireless device or terminal and/or which resources a wireless device or terminal may use for communication and/or data indicating a resource grant or release, in particular pertaining to uplink and/or downlink resources. A grant or resource or scheduling grant or scheduling data (which, in particular, may pertain to information regarding and/or representing and/or indicating scheduling of resources) may be considered to be one example of allocation data. Allocation data may in particular comprise information and/or instruction regarding a configuration and/or for configuring a terminal, e.g. indicating a measurement configuration to be used. It may be considered that an allocation node or network node is adapted to transmit allocation data directly to a node or wireless device and/or indirectly, e.g. via a relay node and/or another node or base station.

Allocation data may comprise control data and/or be part of or form a message, in particular according to a pre-defined format, for example a DCI format, which may be defined in a standard, e.g. LTE. Allocation data may comprise configuration data, which may comprise instruction to configure and/or set a user equipment for a specific operation mode, in particular a measurement mode, e.g. in regards to the use of receiver and/or transmitter and/or transceiver and/or use of transmission (e.g. TM) and/or reception mode, and/or may comprise scheduling data, e.g. granting resources and/or indicating resources to be used for transmission and/or reception. A scheduling assignment may be considered to represent scheduling data and/or be seen as an example of allocation data. A scheduling assignment may in particular refer to and/or indicate resources to be used for communication or operation.

A wireless device may generally be a terminal, e.g. a user equipment.

A channel may generally be a physical channel, in particular a control channel, e.g. PUCCH. A control channel may be used for and/or carry control information, an uplink control channel for example uplink control information.

Data and/or information may generally be transmitted and/or received as signal/s, which may be carried on a time-frequency resource and/or carrier and/or subcarrier.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

Each or any one of the radio nodes or user equipments shown in the figures may be adapted to perform the methods to be carried out by a radio node or user equipment described herein. Alternatively or additionally, each or any of the radio nodes or user equipments shown in the figures may comprise any one or any combination of the features of a user equipment described herein.

A cell may be generally a communication cell, e.g. of a cellular or mobile communication network, provided by a node. A serving cell may be a cell on or via which a network node (the node providing or associated to the cell, e.g. base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g. a random access procedure, and/or in relation to which it is in a RRC_connected or RRC_idle state, e.g. in case the node and/or user equipment and/or network follow the LTE-standard. One or more carriers (e.g. uplink and/or downlink carrier/s and/or a carrier for both uplink and downlink) may be associated to a cell.

In this disclosure, for purposes of explanation and not limitation, specific details are set forth (such as particular network functions, processes and signalling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

A radio node or network device or node or a user equipment may be or comprise a software/program arrangement arranged to be executable by a hardware device, e.g. control circuitry, and/or storable in a memory, which may provide dual connectivity functionality and/or corresponding control functionality and/or control functionality to carry out any one of the methods described herein and/or to implement any one or more than one functionalities of a user equipment and/or network node described herein.

The invention claimed is:

1. A method for operating a terminal in a wireless communication network, the method comprising:
    determining, based on at least one parameter related to one or more measurement configurations, one out of a plurality of measurement report mappings,
    wherein the plurality of measurement report mappings has different resolutions: and
    mapping, by using the determined measurement report mapping, measurement data to at least one measurement indicator, the mapping being based on at least one taken from the group consisting of an adaptable resolution of a measurement and a resolution configuration of a measurement;
    wherein the measurement comprises a measurement of at least one taken from the group consisting of a bandwidth and a sampling rate of at least one positioning signal.

2. The method of claim 1, wherein the measurement comprises a runtime measurement.

3. The method of claim 1, wherein the measurement comprises a runtime range measurement.

4. The method of claim 1, wherein the measurement comprises a runtime difference measurement.

5. The method of claim 4, wherein the runtime difference measurement comprises a difference between runtimes of positioning signals from at least two signal sources.

6. The method of claim 1, wherein the measurement comprises a measurement of at least one positioning signal.

7. The method of claim 1, wherein the measurement comprises a measurement of a bandwidth of at least one positioning signal.

8. The method of claim 1, wherein the measurement comprises a measurement of a sampling rate of at least one positioning signal.

9. The method of claim 1 further comprising using the mapping for a multilateration process.

10. The method of claim 1, wherein the measurement is performed by the terminal.

11. A terminal for a wireless communication network, the terminal comprising a processor and memory, the processor and memory being configured to:
    determine, based on at least one parameter related to one or more measurement configurations, one out of a plurality of measurement report mappings, wherein the plurality of measurement report mappings has different resolutions: and
    map, by using the determined measurement report mapping, measurement data to at least one measurement indicator, the mapping being based on at least one taken from the group consisting of an adaptable resolution of a measurement and a resolution configuration of a measurement;
    wherein the measurement comprises a measurement of at least one taken from the group consisting of a bandwidth and a sampling rate of at least one positioning signal.

12. The terminal of claim 11, wherein the measurement comprises a runtime measurement.

13. The terminal of claim 11, wherein the measurement comprises a runtime range measurement.

14. The terminal of claim 11, wherein the measurement comprises a runtime difference measurement.

15. The terminal of claim 14, wherein the runtime difference measurement comprises a difference between runtimes of positioning signals from at least two signal sources.

16. The terminal of claim 11, wherein the measurement comprises a measurement of at least one positioning signal.

17. The terminal of claim 11, wherein the terminal is further configured to use the mapping for a multilateration process.

18. The terminal of claim 11, wherein the measurement is performed by the terminal.

19. A terminal for a wireless communication network, the terminal comprising a processor and memory, the processor and memory being configured to:
    determine, based on at least one parameter related to one or more measurement configuration, one out of a plurality of measurement report mappings,
    wherein the plurality of measurement report mappings has different resolutions: and map, by using the determined measurement report mapping, measurement data to at least one measurement indicator, the mapping being based on at least one taken from the group consisting of an adaptable resolution of a measurement and a resolution configuration of a measurement;

wherein the measurement comprises a measurement of at least one taken from the group consisting of a bandwidth and a sampling rate of at least one positioning signal.

* * * * *